US008639764B2

(12) United States Patent
Rao

(10) Patent No.: US 8,639,764 B2
(45) Date of Patent: Jan. 28, 2014

(54) AUTOMATED BLOGGING AND SKILLS PORTFOLIO MANAGEMENT SYSTEM

(76) Inventor: Bindu Rama Rao, Laguna Niguel, CA (US)

( * ) Notice: Subject to any disclaimer, the term of this patent is extended or adjusted under 35 U.S.C. 154(b) by 607 days.

(21) Appl. No.: 12/925,417

(22) Filed: Oct. 21, 2010

(65) Prior Publication Data

US 2012/0102091 A1 Apr. 26, 2012

(51) Int. Cl.
*G06F 15/16* (2006.01)
(52) U.S. Cl.
USPC .......................................................... 709/206
(58) Field of Classification Search
None
See application file for complete search history.

(56) References Cited

U.S. PATENT DOCUMENTS

2010/0158315 A1* 6/2010 Martin .......................... 382/103

* cited by examiner

*Primary Examiner* — Scott Christensen

(57) ABSTRACT

An automated blogging and skills portfolio management system that is capable of facilitating easy blog message posting by a multitude of people witnessing a sports event or some other public event, wherein players, spectators and others can provide comments and observation regarding that particular event while the event is going on. In fact, the present invention makes it possible for the players, spectators and others to provide comments and observations in the form of audio recording, that provide the context to any digital photos and videos they provide. The present invention makes it possible to simultaneously create a blog for that event, in an automated mode (without any special setup or extensive operations) that can be shared with others. Most importantly, the present invention makes it possible for players and others to leverage such blogs to create and manage skills portfolios for the players.

20 Claims, 3 Drawing Sheets

AUTOMATED BLOGGING AND SKILLS PORTFOLIO MANAGEMENT SYSTEM

CROSS REFERENCES TO RELATED APPLICATIONS

N/A

BACKGROUND

1. Technical Field

The present invention relates generally to blogging, and specifically to the use of mobile devices for blogging.

2. Related Art

In the last decade, mobile devices of all kinds have proliferated all over the world. Some of them are small tiny cellular phones, others are more powerful and flexible smartphones, some are small electronic tablets and tiny netbooks, etc. All of these are very convenient to use.

The Internet is a very powerful communication means and quite often, the mobile devices available in the world can employ the Internet for communication. Most of them also employ the telecom networks (such as cellular networks) for communication. Some of the mobile devices can use both the Internet as well as the telecom networks for communications.

People using mobile devices such as mobile phones often find a camera embedded in the mobile phones and take pictures. Some of them are also capable of emailing these pictures to friends. Of late, some mobile devices have become capable of displaying digital videos and movies. Some of them are also able to capture small digital video clips.

Quite a few websites make it possible for a user to use his laptop or PC to upload photos to the websites. Such photos are typically uploaded to an album online and sometimes shared with friends. The YouTube service on the Internet makes it possible for a user to record a digital video and upload them from their laptop or personal computers to the YouTube server. Such videos can also be shared with friends.

There are currently no generally available means by which a group of people can simultaneously participate in creating a blog on a sports event that they are currently participating in, or witnessing, or for a outdoor entertainment event that they visit. There are no easy to use methods by which all the people watching a game can share their observations while they are viewing the game, especially if they have to share photos, observations, share videos, etc. There is no available solution currently in the market by which these players (in sports events) and spectators can make comments about a local sports match they are playing in or witnessing, while that match is going on. For example, if a youth soccer league match is being witnessed by several parents and other spectators, there is no easy way in which all of them can take pictures and share them among themselves and with others (such as their friends at schools, etc.). In addition, there are no easy means by which the players, spectators, etc. witnessing a match can share their observations regarding the match with others. What most people do is to take photos on their cameras or cellular phones and save them for subsequent (quite often after a few weeks) upload to online albums. Some of them, much later at home, sometimes several days later, upload it to a website album. They then send an email to their friends (assuming they know their email addresses, or some form of contact information, which is often not the case) asking them to view their online album. This is not only a laborious process but also time consuming and inconvenient. The recipients of these emails have to often use their laptops to read the emails and then visit the online album whose link may have been provided in the email. Quite often these albums contain several photos and the viewer does not know the details of each photo and does not know the context of individual photos.

There are currently no easy means by which a youth athlete can as create a skills portfolio. It would be useful if a youth athlete or sportsman could maintain a skills portfolio, such as the ones painters and other artists do, when they paint a number of canvases and carry them physically in their physical portfolios, so that they can show it to others, as needed. There are no easy ways in which a youth athlete can make such a portfolio of his/her sports skills for sharing.

Most young people are familiar with Facebook accounts and twitter services and often use them. But beyond following some tweets provided by celebrities and their favorite stars (such as Madonna), most young people don't find Twitter useful. Most young people in urban areas have access to computers and laptops and use them to maintain a Facebook account, through which they post their photos, and details of their hobbies, habits, personal lifestyles etc. Facebook pages are used to talk about their personal lives, share information about their idiosyncrasy, etc. In addition, Facebooks pages are full of personal details that are often not flattering, and are far from being professional.

In view of the foregoing considerations, it is clear that there is a need for an improved system and method that is capable of facilitating easy blogging by a multitude of people/spectators witnessing a sports event or some other public event. There is a need for such spectators to share comments and observation regarding that particular event. There is a need for a solution wherein a user can generate sports blogs in an easy and automated fashion, and also to use such blogs, or some portion thereof, to share information with others. These things don't exist today. There is need for leveraging such blogs to create and manage skills portfolios, but such facilities do not exist today.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE DRAWINGS

The present invention provides an automated blogging and skills portfolio management system 105 that is capable of facilitating easy blogging by a multitude of people witnessing a sports event or some other public event, wherein players, spectators and others can provide comments and observation regarding that particular event while the event is going on. In fact, the present invention makes it possible for the players, spectators and others to provide comments and observations in the form of audio recording, that provide the context to any digital photos and videos they provide. The present invention makes it possible to simultaneously create a blog for that event, in an automated mode (without any special setup or extensive operations) that can be shared with others. Most importantly, the present invention makes it possible for players and others to leverage such blogs to create and manage skills portfolios for the players.

Figure 1:
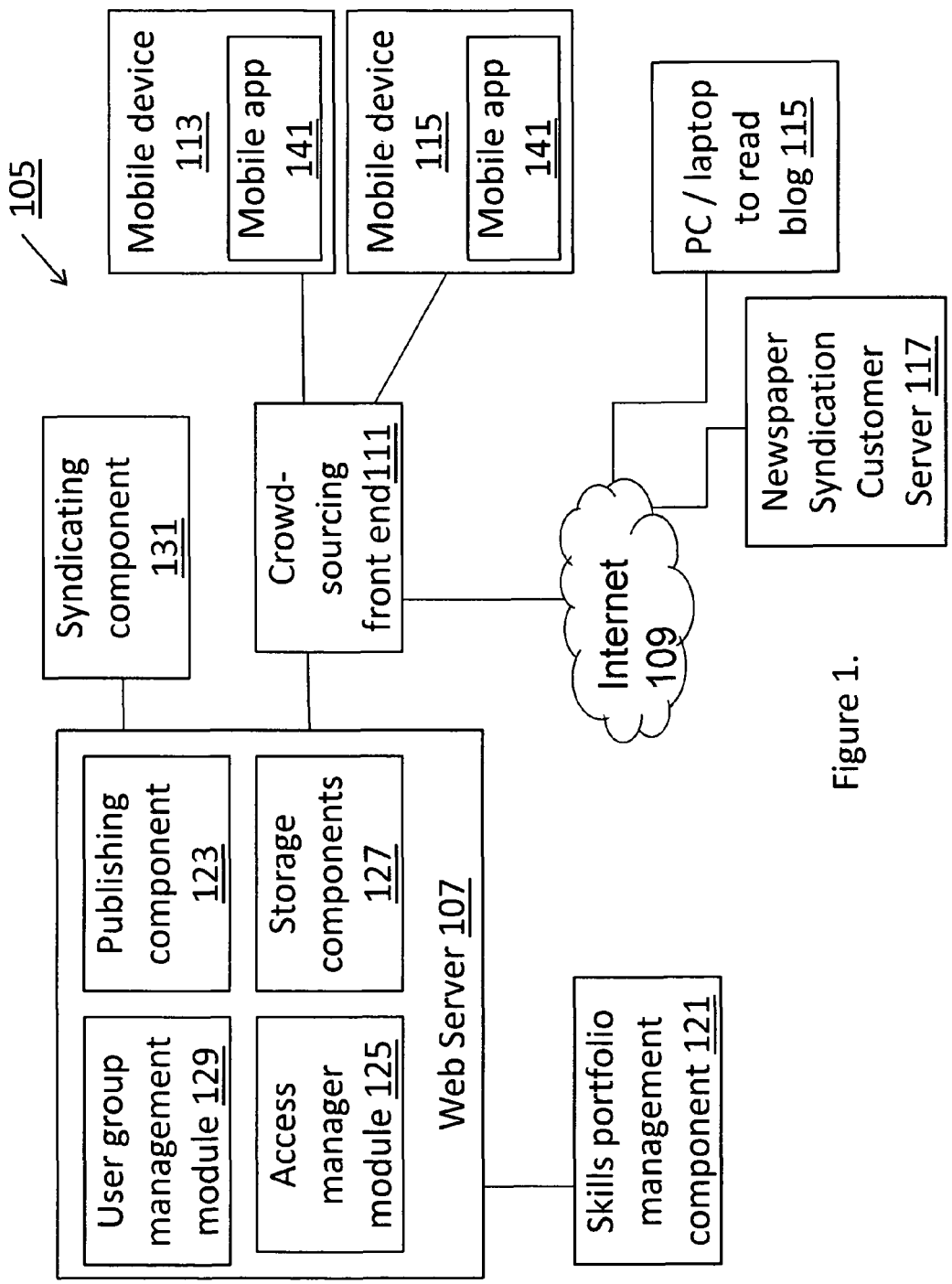
FIG. 1 is a perspective block diagram of an automated blogging and skills portfolio management system accessible via the Internet and telecom networks that facilitates easy blog message posting by a multitude of people witnessing a public or private event (such as a sports event or any other event), automated blog generation, and skills portfolio management (such as a sports skill portfolio managed by a player or performer).

FIG. 1 is a perspective block diagram of an automated blogging and skills portfolio management system 105 accessible via the Internet and telecom networks that facilitates easy blog message posting by a multitude of people witnessing a public or private event (such as a sports event or any other event), automated blog generation, and skills portfolio management (such as a sports skill portfolio managed by a player or performer), is a perspective block diagram of an automated blogging and skills portfolio management system 105 accessible via the Internet and telecom networks that facilitates easy blog message posting by a multitude of people witnessing a public or private event (such as a sports event or any other event), automated blog generation, and skills portfolio management (such as a sports skill portfolio managed by a player or performer). The automated blogging and skills portfolio management system 105 comprises a crowd-sourcing front end 111 capable of receiving a plurality of messages from a plurality of mobile devices 113, 115 wherein each of the plurality of messages comprises at least one of a digital photo, a user recorded audio, a digital video and a textual input. It also comprises a web server 107 communicatively coupled to the crowd-sourcing front end 111 that facilitates processing of the plurality of messages and storage of the plurality of messages in storage components 127, and a publishing component 123 that is used to publish at least one blog based at least on the plurality of messages.

The web server 107 associates each of the plurality of messages with a current event. For example, if a group of people watching a college football game post blogging messages from the mobile devices 113, 115, the associated event is the football game, a reference to which is maintained by the web server 107, and that reference is incorporated into the plurality of blogging messages posted by the group of people during the match, and soon after that match. These messages can include observations and comments made, in textual form with textual inputs, in audio form using recorded audio messages, etc.

The web server 107 provides the plurality of messages in a blog that is created in an automated fashion, and it also provides them to the mobile devices 113, 115 as messages posted to an associated user group. Specifically, the web server 107 provides access from the plurality of mobile devices 113, 115 employing a downloadable mobile app available in the plurality of mobile devices 113, 115.

The web server 107 employs the publishing component 123 to dynamically generate a blog that is associated with the current event (sporting event or any other event), based on the plurality of messages received for that current event, wherein the blog is accessible on the Internet and telecom networks. The collection of messages received for the current event is managed by the web server, and a current event message window is selectively employed. For example, for a football game event at a high school, the current event message window may open up on the previous day and it can close on the day of the football game, immediately after the end of the game.

A skills portfolio management component 121, communicatively coupled to the web server 107 and to the publishing component 123 makes it possible for a user to create and manage a skills portfolio. For example, a youth athlete can create a skills portfolio, include references to the blog in that skills portfolio, add personal details and contact information, and share that with college recruiters and others. In general, the skills portfolio management component 121 facilitates incorporation, by a user, of at least one of the plurality of messages, into a skills portfolio associated with the user, that is selectively accessible from the Internet and telecom networks.

The web server 107 facilitates blogging for a plurality of user groups that are managed via the web server 107. In specific, it comprises a user group management module 129 that facilitates user group management. Each of the plurality of user groups comprises a list of members, wherein each member of the list of members can participate in posting blogging messages to blogs associated with an individual user group. Members can also access these individual blogs, from more than one of the plurality of user groups based on their membership to these user groups. Such access can be over the Internet or over telecom networks (such as cellular networks), and they can be via PC/laptop 115 with browsers or mobile devices 113, 115 with a specific downloadable mobile app (such as the SportsDuJour mobile app). In addition, for mobile devices 113, 115 that comprise micro browsers, the blogs can also be accessed using these micro browsers, although sending of messages to these blogs would require the downloadable mobile app for easy and convenient blogging. An access manager module 125 of the web server 107 facilitates access to blogs, processing membership requests to user groups, access security information management, etc.

The web server 107 facilitates the posting of one of the plurality of messages from an associated one of the plurality of mobile devices 113, 115, by a member of the list of members associated with one of the plurality of user groups. The storage components 127 are associated with one or more of the plurality of user groups. The plurality of mobile devices 113, 115 each employ the downloadable mobile app 141 to post blogging messages, to review messages provided by the web server 107 and to review user group specific blogs.

The selective automatic incorporation of posted messages into a user's skills portfolio is supported by the web server 107. For example, a youth athlete can configure his user account such that blog messages (comprising digital photos, audio recording, digital video content, etc.) from specific contributors (parents, coaches, etc.) can be automatically included into the skills portfolio for that user. In a related embodiment, all messages from a specific user account or phone number are processed and incorporated into the skills portfolio for that user. The youth athlete can subsequently edit them, delete them or accept them as presented, using the skills portfolio management component 121.

The skills portfolio management component 121 facilitates creation of "recommendations", "performance reviews" and "feedback", and their management by a user. For example, a youth athlete can receive audio, digital video and/or textual recommendations from one or more people, such as from his coaches, teachers, etc. The web server 107 provides web pages that facilitate such interactions by a user with the skills portfolio management component 121. These recommendations can be 'accepted', 'rejected' or 'deleted' by a user (such as a youth athlete).

In one embodiment, the skills portfolio management component 121 as well as the crowd-sourcing front end are part of the web server 107.

In one embodiment of the automated blogging and skills portfolio management system 105, a publishing component 123 is associated with each of the plurality of user groups that are currently available, and the publishing component 123 dynamically generates a blog for each of the plurality of user groups for review by a user. Such review can be conducted using the downloadable mobile app 141 on one of the plurality of mobile devices 113, 115. The web server 107 also facilitates review of the blog for each of the plurality of user groups over the Internet. For example, it presents the blog in user group specific web pages provided for blog review purposes.

In one embodiment, the skills portfolio management component 121 facilitates the incorporation a blog message created by a member of one of the plurality of user groups into a corresponding user's skill portfolio. For example, if a parent of a youth athlete is a member of a soccer club group, and blogs a message during a soccer match, the blogged message is automatically incorporated into the skills portfolio of the youth athlete. The youth athlete can subsequently edit it or modify it, as necessary. Or he can accept it as it is and use it as part of the skills portfolio.

In general, the skills portfolio management component 121 facilitates, via the web server 107, the management of the user's skill portfolio by a user (such as a member of one of the plurality of user groups), wherein the management comprises editing, enhancing, replacing, modifying, sharing, adding, or deleting at least one portion of the user's skill portfolio.

In one embodiment, the web server 107 facilitates the retrieval of message from a mobile device 113 based on the associated user group. For example, it facilitates retrieval from the mobile device 113 for review as a message in a list of available relevant messages, or as part of a blog for that user group. The web server 107 also facilitates the retrieval of the message using mobile device 113 based on a current event, such as a championship game for the season.

The user group management module 129 makes it possible to create user groups, manage user groups, add members to them, delete members, etc. In one embodiment, the plurality of user groups managed by the user group management module 129 are sports related groups and wherein the list of members for each of the plurality of user groups comprises players, their parents, sports fans and spectators. In a different embodiment, the plurality of user groups managed are music related groups (such as orchestra music group, high school band group, choir group, jazz group, etc.) and wherein the list of members for each of the plurality of user groups comprises players of musical instruments, their teachers, and parents, etc.

The publishing component 123, in general, helps publish a blog based on received blog messages, such as those posted by spectators/audiences during a live event. For example, it helps publish a sports blog for each of the plurality of sports related user groups created and maintained by the automated blogging and skills portfolio management system 105.

The automated blogging and skills portfolio management system 105 also comprises a syndicating component 131 that makes it possible to share the various blog (sports related, music related, education related, etc.) with one or more external servers associated with news paper companies as part of syndication operation. For example, all high school sports related blogs are customized for a newspaper syndication customer and presented via a special syndication front end (look and feel customized as necessary) to a newspaper syndication customer server 117 (newspaper company) that selectively reuses a portion of one or more blogs in its online or printed versions of newspaper editions. In addition, the same blogs (or more specifically, a current edition/version of those blogs as they pertain to an event of interest) are forwarded to newspapers and magazines (that are part of the syndication group) as an RSS (Really Simple Syndication) feed.

In general, event specific blogs are dynamically created and presented by the skills portfolio management system 105. In addition, the blogs for the plurality of user groups is created dynamically based on messages received for those groups from the plurality of users experiencing, viewing or participating in those events, the messages being sent primarily from their mobile devices, such as cellular phones, tablets, netbooks, smartphones, laptops etc.

Figure 2:
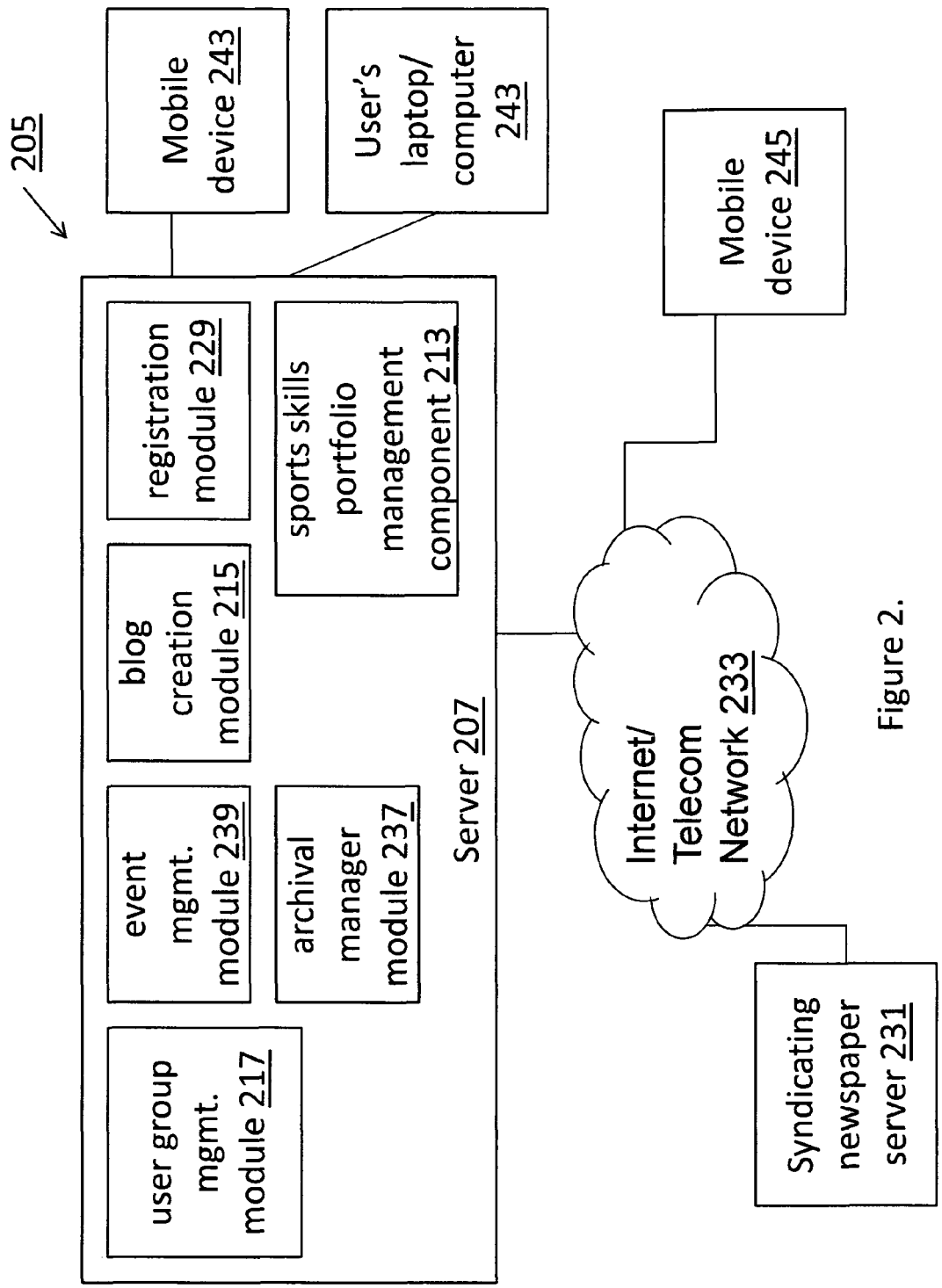
FIG. 2 is a perspective block diagram of a system for automatic sports blogging and sports skills portfolio management which makes it possible for players and spectators in a live game to blog messages from their mobile device, wherein the messages comprise of a digital photo, an audio recording, a digital video recording, textual message or a combination thereof.

FIG. 2 is a perspective block diagram of a system for automatic sports blogging and sports skills portfolio management 205 which makes it possible for players and spectators in a live game to blog messages from their mobile device, wherein the messages comprise of a digital photo, an audio recording, a digital video recording, textual message or a combination thereof. The system for automatic sports blogging and sports skills portfolio management 205 comprises a server 207 capable of collecting messages from a plurality of user's laptop/computer/mobile device 243. The mobile devices 243, 245 are used by players and spectators during a sporting event, wherein each of the messages posted by them comprises at least one of a digital photo, an audio recording and a textual input. The server 207 automatically presents a blog associated with the sporting event (such as a varsity state championship match), based on the messages posted. Other users can access the blog over the Internet and telecom networks or using a downloadable mobile app on their mobile devices 243.

The server 207 comprises a sports skills portfolio management component 213 that facilitates management of a sports skills portfolio by each of the registered players. A registration module 229 facilitates player registration, and each player (youth athlete in general) is presented a player profile and a player sports skills portfolio, that they can then manage, and share with others. Parents of players, their friends, and other sports fans too, can register (via the web server 207 or the mobile device 243) to a) become members of one or more sports related user groups, b) acquire a downloadable mobile app that can be installed on their mobile devices 243, that facilitates blogging to those sports related groups c) post blog messages from their mobile phones 243 and laptops as they are watching a match/game/sports event.

The sports skills portfolio management component 213 enables the addition of one or more posted messages (from the blog created) by one of the players into a corresponding sports skills portfolio. The sports skills portfolio management component 213 also facilitates selective sharing of the sports skills portfolio managed by the players with other users and with authorized external entities. It also facilitates solicitation of recommendations by the players from coaches, teachers and friends, etc.

The posted blog messages from the plurality of mobile devices 243, 245 typically originate at the sporting event and are sent by users who are players, coaches, spectators and sports fans. The sporting event is listed at the server 207, and the blog associated with the sporting event is automatically created by the server and presented for review by users, and it comprises at least one or more of these blog messages posted live by users during a sporting event.

A blog creation module 215 in the web server 207 manages automatic blog creation for a sporting event. An event management module 239 in the web server 207 makes it possible to enter information regarding sporting events and subsequently monitor messages collected for those events. It facilitates collection of blog posts by users during a sporting event, accepting blog posts between a start time and a stop time (in general). The blogging is thus "open" for a certain window of blogging" between the start and stop times specified by a event manager (a user in charge of that particular event). The server 205 facilitates addition, modification and enhancement to a blog associated with the sporting event after collecting messages from the plurality of mobile devices for a sporting event.

Blogs for a sporting event are in a current state for a few days, called the 'window of current access' and then become a target for archival. The server 207 facilitates archival of the blog after a window of current access expires. An archival manager module 237 in the web server 207 is responsible for archival of blogs, and it handles all management of archived blogs. The server 207 makes the blog available for access using a personal computer or the plurality of mobile devices during the window of current access. When it expires, the blog goes into an archived state, from which the user can still retrieve it, as necessary.

Each of the posted blog messages comprises at least one of a digital streaming video, a recorded digital video, a streaming audio and recorded audio. For each blogging message posted, the server compiles a primary player identification, an event identification, a location identification, a message contributor identification, an event date, an organization identification, and a region identification. For example, if a blogging message is posted by a user using the mobile device 243 or 245, the primary player identification is determined from user input provided or from a registration information stored by the registration module 229 (that identifies the primary player). The event identification is determined based on current active events, or from user input provided. A location identification is determined from event information available at the server 207, or from GPS coordinates 9 or other GPS information) provided by the mobile device 243. A message contributor identification is determined by a user account information for the user, or from a phone number for that user (entered by the user or retrieved from his registration information). An event date is determined from a calendar of events maintained by the server 207. An organization identification is determined from user input from the blog or from an organization associated with the primary player identification. A region identification is solicited from the user or determined from a combination of sources—primary player identification, GPS coordinates, calendar entries, and organization details.

A user group management module 217 facilitates creation of user groups for various sports groups, sports clubs, sports teams, etc. It facilitates addition of members to those user groups, such as addition of players, etc. It helps maintain lists of players of various sports teams, clubs, etc. It also makes it possible to identify primary player identifications for other blogging users, such as parents of players (or their friends, etc.)

Figure 3:
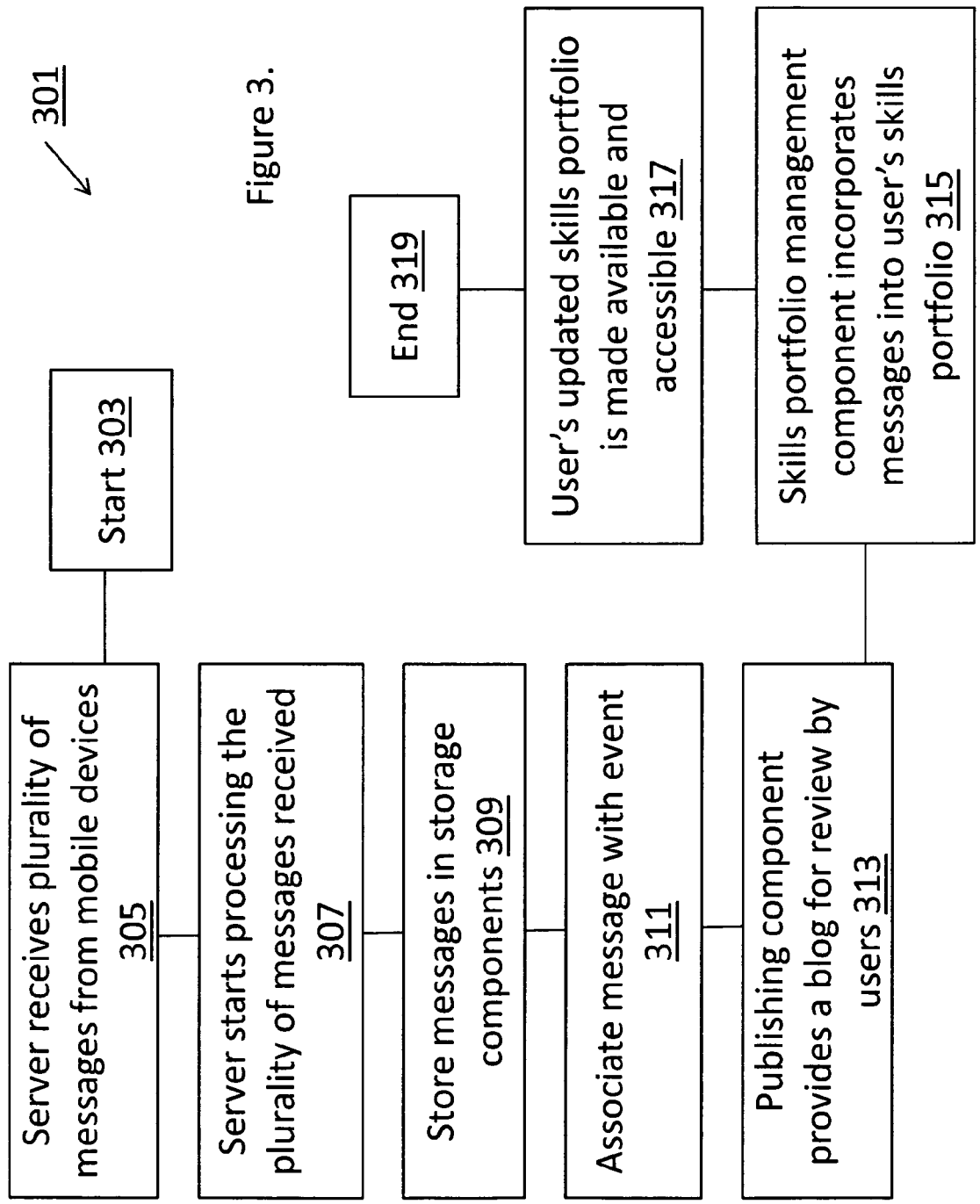
FIG. 3 is a flow chart of an exemplary operation of an automated blogging and skills portfolio management system.

FIG. 3 is a flow chart of an exemplary operation 301 of an automated blogging and skills portfolio management system. The processing starts at a start block 303 when the user's blog message is received by the server 107. Typically, a user of the mobile device 113, that comprises the necessary and compatible mobile app, takes a photo, records a message and creates a message. Then the user selects a user group from a list those that the user is currently a member of (or associated with) and posts the message. The message is communicated to the server 107.

Then, at a next block 305, the server receives a plurality of messages from a plurality of mobile devices 113, 115, by means of a crowd-sourcing front end 111. Each of the plurality of messages comprises at least one of a digital photo, a user recorded audio, a digital video and a textual input.

Then, at a next block 307, the server 107 starts processing the plurality of messages received. It determines the sender, the primary player (if any is specified), the current event to which the message is to be associated, the user group associated, etc. Then, at a next block 309, the web server, as necessary, stores the messages in storage components 127 before and after processing. Storing the plurality of messages in the storage components typically involves storing audio, digital photos, in file systems or special multi-media servers, and textual data and related information in database records. Each recorded audio is typically received and stored in the form of an MP3 file, an AMR file or a way file (other formats are also contemplated). Each digital photo is typically received and stored in the JPEG format, PNG format etc. Digital videos are received as MPEG2 format. MPEG 4 formats, AVI format, DVI format, etc. Then, at a next block 311, the web server 107 associates each of the plurality of messages with an open current event. The web server 107 (or the event management module 239) provides details of current events, such as a sports event or musical event, based on a calendar of events, a regional identification, etc. If some of the received messages are associated with a current sports event, they are routed to the corresponding user groups and blog frameworks. If other messages are associated with a current musical event (such as an orchestra event), they are also routed to another corresponding user group and blog framework.

Then, at a next block 313, the web server, employing the publishing component 123 provides a blog for review by users. It also makes the plurality of messages available for access from the plurality of mobile devices employing a downloadable mobile app available in the plurality of mobile devices. The publishing component communicatively coupled to the web server, publishes at least one blog based at least on the plurality of messages.

Then, at a next block 315, the skills portfolio management component incorporates at least one of the plurality of messages into a skills portfolio associated with the user. At a next block 317, the user's updated skills portfolio is made available and accessible over the Internet and telecom networks.

In one embodiment, the web server facilitates blogging for a plurality of user groups managed via the web server, wherein each of the plurality of user groups comprises a list of members, wherein each member of the list of members can participate in posting messages to, and accessing blogs from, more than one of the plurality of user groups.

In one embodiment, in the block 313, the activity of publishing comprises generating dynamically, by the publishing component 123, at least one blog that is associated with the current event, based on the plurality of messages, wherein the blog is accessible on the Internet and telecom networks.

In one embodiment, additional activities conducted by the web server include managing a sports skills portfolio, as instructed by a user, (using a computer or one of the plurality of mobile devices). Typically, managing comprises creating a sports skills portfolio for the user, adding at least one of the plurality of messages to the sports skills portfolio, entering, optionally, a reference to a specific blog or sporting event into the sports skills portfolio, entering user details and contact information, using the web server; and storing the sports skills portfolio in the storage components.

In another embodiment, additional activities conducted by the web server include sharing the sports skills portfolio with other entities, wherein the other entities are one of college recruiters, sports organizations, schools, newspaper companies and advertisers.

As one of ordinary skill in the art will appreciate, the terms "messages" and "blogging messages," as may be used herein, include all types of messages posted to be blogged by users witnessing or participating in events. The terms "events" includes sporting events such as football and basket ball games, musical events such as the orchestra, concerts, etc.

Although the present invention has been described in terms of sporting events, it must be clear that the present invention also applies to other types of events and entertainment means.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. An automated blogging and skills portfolio management system accessible via the Internet and telecom networks, the automated blogging and skills portfolio management system comprising:
 a crowd-sourcing front end configured to receive a plurality of messages from a plurality of mobile devices, each mobile device associated with at least one user,
  wherein each of the plurality of messages comprises at least one of a digital photo, a user recorded audio, a digital video and a textual input,
  wherein each of said messages are associated with at least one participant;
 a web server communicatively coupled to the crowd-sourcing front end that stores each of the plurality of messages and makes them retrievable based on at least on a current event, participant, and participant group;
 a publishing component configured to:
  publish at least one blog based at least on the plurality of messages;
  dynamically generate a blog for each of a plurality of participants and participant groups for review by said at least one participant; and
  dynamically generate a blog page for the current event and presents information about said current event, based on the plurality of messages,
 a skills portfolio management component communicatively coupled to the web server and the publishing component that collects into a skills portfolio, manages the skills portfolio, and presents for display recommendations, performance reviews and feedback received by the at least one,
  wherein the skills portfolio management component stores a plurality of skills portfolios, each associated with a different participant; and
 the skills portfolio management component configured to:
  facilitate incorporation, by the at least one participant, of at least one of the plurality of messages, into the skills portfolio for the at least one participant and management and selective sharing by at least one participant; and
  manage the sharing of the skills portfolio with other entities, wherein the other entities are at least one of college recruiters, sports organizations, schools, newspaper companies and advertisers;
 wherein each skills portfolio comprises:
  a player profile of the associated participant;
  details of sports skills of the associated participant;
  inputs concerning the associated participant from other users;
  recommendations for the associated participant;
  involvement and achievements of the participant in other nonathletic organizations and activities;
  feedback information concerning the associated participant;
  achievements, awards, and other recognitions of the associated participant;
  event performance information of the associated participant; and
  contact information of the associated participant.

2. The automated blogging and skills portfolio management system of claim 1 wherein the web server facilitates blogging for a plurality of participant groups managed via the web server, wherein each of the plurality of participant groups comprises a list of members, wherein each member of the list of members can participate in posting messages to and accessing blogs from more than one of the plurality of participant groups.

3. The automated blogging and skills portfolio management system of claim 1 wherein the web server facilitates posting of one of the plurality of messages from an associated one of the plurality of mobile devices, by a member of the list of members of one of the plurality of participant groups; and
 wherein the plurality of mobile devices each employ the a downloadable mobile app to review messages provided by the web server and to review participant or participant group specific blogs.

4. The automated blogging and skills portfolio management system of claim 1 further comprising:
the publishing component identified with and managed by each of the plurality of participant groups;
the publishing component dynamically generating a blog for each of the plurality of participant groups for review using the downloadable mobile app on one of the plurality of mobile devices; and
the web server facilitating review of the blog for each of the plurality of participant groups over the Internet.

5. The automated blogging and skills portfolio management system of claim 1 further comprising:
the skills portfolio management component facilitating the incorporation of at least one of the plurality of messages by a member of one of the plurality of participant groups into a corresponding participant's skill portfolio; and
the skills portfolio management component facilitating, via the web server,
the management of the participant's user's skill portfolio, wherein the management comprises editing, enhancing, replacing, modifying, sharing, adding, or deleting at least one portion of the participant's skill portfolio.

6. The automated blogging and skills portfolio management system of claim 1 further comprising:
the web server facilitating the retrieval of at least one of the plurality of messages by at least one of the plurality of mobile devices based on the associated one of the plurality of participant groups; and
the web server facilitating the retrieval of at least one of the plurality of messages by at least one of the plurality of mobile devices based at least on the current event.

7. The automated blogging and skills portfolio management system of claim 2 wherein a plurality of participant groups are sports related groups and wherein the list of members for each of the plurality of participant groups also comprises players, their parents, sports fans and spectators.

8. The automated blogging and skills portfolio management system of claim 7 wherein the publishing component publishes a sports blog for each of the plurality of participant groups.

9. The automated blogging and skills portfolio management system of claim 8 further comprising:
a syndicating component that makes it possible to share the sports blog with external servers associated with news paper companies as part of a syndication process services.

10. The automated blogging and skills portfolio management system of claim 2 wherein the plurality of participant groups is created dynamically based on some of the plurality of messages received from the plurality of mobile devices.

11. A non-transitory computer-readable storage medium that, when executed by a processor, performs a method comprising:
receiving a plurality of messages from a plurality of mobile devices, by means of a crowd-sourcing front end, each mobile device associated with at least one user, wherein each of said messages are associated with at least one participant and wherein each of the plurality of messages comprises at least one of a digital photo, a user recorded audio, a digital video and a textual input;
processing of the plurality of messages by a web server communicatively coupled to the crowd-sourcing front end and storing in storage components;
identifying each of the plurality of messages by at least one of a current event, participant, and participant group by the web server, wherein the web server facilitates automatic creation and management of a plurality of participant groups, wherein the participant groups are also organized at least by teams, schools, clubs, camps, and organizations;
providing, by the web server, the plurality of messages for access from the plurality of mobile devices;
publishing, by a publishing component communicatively coupled to the web server, at least one blog based at least on the plurality of messages; and
incorporating, by a participant using a skills portfolio management component communicatively coupled to the web server, at least one of the plurality of messages into a skills portfolio for the participant, that is selectively shared;
wherein the skills portfolio management component stores a plurality of portfolios, each associated with a different participant; and
wherein the skills portfolio comprises for each participant:
a player profile of the associated participant;
details of sports skills of the associated participant;
inputs concerning the associated participant from other users;
recommendations for the associated participant;
involvement and achievements of the participant in other nonathletic organizations and activities;
feedback information concerning the associated participant;
achievements, awards, and other recognitions of the associated participant;
event performance information of the associated participant; and
contact information of the associated participant.

12. The non-transitory computer readable storage medium of claim 11 wherein the messages from the plurality of mobile devices originate at the sporting event and are sent by users who are players, coaches, spectators and sports fans, wherein the sporting event is presented in a list of events, and wherein the blog identified by the sporting event comprises at least one of these messages.

13. The non-transitory computer readable storage medium of claim 12, the method further comprising:
facilitating addition, modification and enhancement to a blog identified by the sporting event after collecting messages from the plurality of mobile devices for a sporting event;
archiving of the blog after a window of
current access, wherein a status of the blog is maintained in a current state during the window of current access and subsequently maintained in an archived state after the window of current access, for each sporting event or for individual participants; and
making the blog available for access from a personal computer or to the plurality of mobile devices.

14. The non-transitory computer readable storage medium claim 11 wherein each of the messages further comprises at least one of a digital streaming video and a recorded digital video.

15. The non-transitory computer readable storage medium of claim 11 wherein for each message posted, at least one of the following are compiled and stored: a primary player identification, an event identification, a location identification, a message contributor identification, an event date, an organization identification, an associated user group and a region identification.

16. A method for automated blogging and skills portfolio management, the method comprising:
receiving a plurality of messages from a plurality of mobile devices, by means of a crowd-sourcing front end, each mobile device associated with at least one user, wherein each of said messages are associated with at least one participant and wherein each of the plurality of messages comprises at least one of a digital photo, a user recorded audio, a digital video and a textual input;

processing of the plurality of messages by a web server communicatively coupled to the crowd-sourcing front end and storing in a storage components;

identifying each of the plurality of messages by at least one of a current event, participant, and participant group by the web server, wherein the web server facilitates automatic creation and management of a plurality of participant groups, wherein the participant groups are also organized at least by teams, schools, clubs, camps, and organizations;

providing, by the web server, the plurality of messages for access from the plurality of mobile devices;

publishing, by a publishing component communicatively coupled to the web server, at least one blog based at least on the plurality of messages; and incorporating, by a participant using a skills portfolio management component communicatively coupled to the web server, at least one of the plurality of messages into a skills portfolio for the participant, that is selectively shared;

wherein the skills portfolio management component stores a plurality of portfolios, each associated with a different participant; and wherein the skills portfolio comprises for each participant:
a player profile of the associated participant;
details of sports skills of the associated participant;
inputs concerning the associated participant from other users;
recommendations for the associated participant;
involvement and achievements of the participant in other nonathletic organizations and activities;
feedback information concerning the associated participant;
achievements, awards, and other recognitions of the associated participant;
event performance information of the associated participant; and
contact information of the associated participant.

17. The method of claim 16 wherein the web server facilitates blogging for a plurality of participant groups managed via the web server, wherein each of the plurality of participant groups comprises a list of members, wherein each member of the list of members can participate in posting messages to, and accessing blogs from, more than one of the plurality of participant groups.

18. The method of claim 16 wherein publishing comprises:
generating dynamically, by the publishing component, the at least one blog that is identified by at least the current event and presents information about the current event, based on the plurality of messages, wherein the blog is accessible on the Internet and by telecom networks.

19. The method of claim 16 further comprising:
managing a sports skills portfolio, using the web server, by a participant using a computer or one of the plurality of mobile devices, wherein managing comprises:
creating a sports skills portfolio for the participant;
adding at least one of the plurality of messages to the sports skills portfolio;
entering, optionally, a reference to a specific blog or sporting event into the sports skills portfolio;
entering participant details and contact information, using the web server; and
storing the sports skills portfolio in the storage components.

20. The method of claim 16 further comprising:
sharing the skills portfolio with other entities, wherein the other entities are at least one of college recruiters, sports organizations, schools, newspaper companies and advertisers.

\* \* \* \* \*